(12) United States Patent
Verbeke et al.

(10) Patent No.: US 12,367,703 B2
(45) Date of Patent: Jul. 22, 2025

(54) MULTI-TASK FACE DETECTOR AND LANDMARK DETECTOR

(71) Applicant: Harman International Industries, Incorporated, Stamford, CT (US)

(72) Inventors: Joseph Verbeke, San Francisco, CA (US); Dmitry Yashunin, Nizniy Novgorod (RU); Tamir Igorevich Baydasov, Nizniy Novgorod (RU); Roman Vlasov, Nizhniy Novgorod (RU)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 425 days.

(21) Appl. No.: 17/758,876

(22) PCT Filed: Jun. 24, 2020

(86) PCT No.: PCT/US2020/039416
§ 371 (c)(1),
(2) Date: Jul. 14, 2022

(87) PCT Pub. No.: WO2021/145920
PCT Pub. Date: Jul. 22, 2021

(65) Prior Publication Data
US 2023/0082834 A1 Mar. 16, 2023

(30) Foreign Application Priority Data
Jan. 17, 2020 (RU) .................................. 2020101638

(51) Int. Cl.
G06V 40/16 (2022.01)
G06V 10/44 (2022.01)
G06V 10/82 (2022.01)

(52) U.S. Cl.
CPC .......... *G06V 40/161* (2022.01); *G06V 10/454* (2022.01); *G06V 10/82* (2022.01); *G06V 40/168* (2022.01)

(58) Field of Classification Search
CPC ...... G06F 18/24; G06N 3/045; G06V 10/454; G06V 10/764; G06V 10/82; G06V 40/161; G06V 40/168; G06T 2207/30201
See application file for complete search history.

(56) References Cited

U.S. PATENT DOCUMENTS

2017/0147905 A1 5/2017 Huang et al.
2019/0171871 A1* 6/2019 Zhang .................. G06V 40/103
(Continued)

FOREIGN PATENT DOCUMENTS

CN 109886241 A 6/2019

OTHER PUBLICATIONS

Zhang, J. et al. "Fastpose: Towards real-time pose estimation and tracking via scale-normalized multi-task networks." arXiv preprint arXiv:1908.05593 (2019). (Year: 2019).*
(Continued)

*Primary Examiner* — Katrina R Fujita
(74) *Attorney, Agent, or Firm* — McCoy Russell LLP

(57) ABSTRACT

Methods and systems are provided for facial detection techniques for image processing neural networks. In one example, a method may include collecting multi-channel outputs of a set of context modules, providing them to both a face detection head and a landmark localization head of the neural network. The face detection head may then generate bounding boxes which are also provided to the landmark localization head. Based on the output of the context modules and the bounding boxes, the landmark localization head may provide an output including a set of landmark indicators.

15 Claims, 5 Drawing Sheets

(56) References Cited

U.S. PATENT DOCUMENTS

| | | | |
|---|---|---|---|
| 2021/0090284 A1* | 3/2021 | Ning | G06V 40/23 |
| 2021/0166092 A1* | 6/2021 | Mabyalaht | G06V 30/194 |
| 2021/0182625 A1* | 6/2021 | Arar | G06V 10/82 |
| 2021/0192182 A1* | 6/2021 | Huang | G06F 18/2413 |
| 2021/0390704 A1* | 12/2021 | Fujimoto | G06V 10/82 |

OTHER PUBLICATIONS

Zhang, K. et al. "Joint face detection and alignment using multitask cascaded convolutional networks." IEEE signal processing letters 23.10 (2016): 1499-1503. (Year: 2016).*
Zhuang et al. "FLDet: A Cpu real-time joint face and landmark detector." 2019 International Conference on Biometrics (ICB). IEEE, 2019. (Year: 2019).*
Earp et al. "Face detection with feature pyramids and landmarks." arXiv preprint arXiv:1912.00596 (2019). (Year: 2019).*
Chuan et al. "Head pose estimation via multi-task cascade CNN." Proceedings of the 2019 3rd High Performance Computing and Cluster Technologies Conference. 2019. (Year: 2019).*
Ghofrani et al. "Realtime face-detection and emotion recognition using mtcnn and minishufflenet v2." 2019 5th conference on knowledge based engineering and innovation (KBEI). IEEE, 2019. (Year: 2019).*
Lin et al. "Feature Pyramid Networks for Object Detection." 2017 IEEE Conference on Computer Vision and Pattern Recognition (CVPR). IEEE, 2017. (Year: 2017).*
Yang et al. "Faceness-net: Face detection through deep facial part responses." IEEE transactions on pattern analysis and machine intelligence 40.8 (2017): 1845-1859. (Year: 2017).*
Szegedy, C. et al., "Going Deeper With Convolutions," Proceedings of the 2015 IEEE Conference on Computer Vision and Pattern Recognition (CVPR), Jun. 7, 2015, Boston, Massachusetts, 9 pages.
Ren, S. et al., "Faster R-CNN: Towards Real-Time Object Detection with Region Proposal Networks," Proceedings of the 28th International Conference on Neural Information Processing Systems (NIPS'15), vol. 1, Dec. 7, 2015, Montreal, Canada, 9 pages.
Lin, T. et al., "Feature Pyramid Networks for Object Detection," Proceedings of the 2017 IEEE Conference on Computer Vision and Pattern Recognition (CVPR), Jul. 21, 2017, Honolulu, Hawaii, 9 pages.
He, K. et al., "Mask R-CNN," Proceedings of the 2017 IEEE International Conference on Computer Vision (ICCV), Oct. 22, 2017, Venice, Italy, 9 pages.
Najibi, M. et al., "SSH: Single Stage Headless Face Detector," Proceedings of the 2017 IEEE International Conference on Computer Vision (ICCV), Oct. 22, 2017, Venice, Italy, 10 pages.
Deng, J. et al., "Single-Stage Joint Face Detection and Alignment," Proceedings of the 2019 IEEE/CVF International Conference on Computer Vision Workshop (ICCVW), Oct. 27, 2019, Seoul, Korea, 4 pages.
Deng, J. et al., "RetinaFace: Single-Shot Multi-Level Face Localisation in the Wild," Proceedings of the 2020 IEEE/CVF Conference on Computer Vision and Pattern Recognition (CVPR), Jun. 13, 2020, Seattle, Washington, 10 pages.
ISA European Patent Office, International Search Report and Written Opinion Issued in Application No. PCT/US2020/039416, Sep. 30, 2020, WIPO, 14 pages.
Zhang, K. et al., "Joint Face Detection and Alignment Using Multitask Cascaded Convolutional Networks," IEEE Signal Processing Letters, vol. 23, No. 10, Oct. 2016, 5 pages.
Zhang, J. et al., "FastPose: Towards Real-time Pose Estimation and Tracking via Scale-normalized Multi-task Networks," ArXiv Cornell University Website, Available Online at https://arxiv.org/abs/1908.05593, Available as Early as Aug. 15, 2019, 11 pages.
State Intellectual Property Office of the People's Republic of China, Office Action and Search Report Issued in Application No. 202080092454.X, Apr. 1, 2025, 64 pages. (Submitted with Partial Translation).

* cited by examiner

MULTI-TASK FACE DETECTOR AND LANDMARK DETECTOR

CROSS-REFERENCE TO RELATED APPLICATIONS

The present application is a U.S. National Phase of International Patent Application Serial No. PCT/US2020/039416 entitled "MULTI-TASK FACE DETECTOR AND LANDMARK DETECTOR," filed on Jun. 24, 2020. International Patent Application Serial No. PCT/US2020/039416 claims priority to Russian Patent Application No. 2020101638, entitled "MULTI-TASK FACE AND LANDMARK DETECTOR," and filed on Jan. 17, 2020. The entirety of the above-listed applications are hereby incorporated by reference for all purposes.

FIELD

The disclosure relates to general to systems and methods for engaging in facial detection.

BACKGROUND

Facial image analysis techniques have many practical applications in automotive, security, retail commerce, and social networks. Facial analysis often begins from basic tasks such as bounding box detection and landmark localization. One technique in use is to sequentially apply single-task models to independently solve a facial detection problem, and a landmark (or "keypoint") detection problem. These single-task models may incorporate or may otherwise be based on application of convolutional neural networks (CNNs).

However, development of a software system consisting of many sequentially applied CNNs may be challenging, because it may be best to train each CNN separately and deal with errors made by previous models. Different heuristics and special training procedures may be applied to achieve robustness of the overall system, but single-task CNNs can't benefit from shared deep representations and additional supervision provided by multiple tasks.

Meanwhile, recent studies suggest that multi-task CNNs that produce multiple predictive outputs may offer improved accuracy and/or improved speed in comparison with single-task counterparts, but may be difficult to train properly. However, in spite of recent achievements in multi-task models in the domain of facial analysis, the accuracy of such models is still unfavorable in comparison with rival single-task models.

The most popular multi-task model, MTCNN, uses cascades of shallow CNNs, but does not share feature representations. Modern end-to-end multi-task approaches are mainly represented by single-shot methods. For landmark localization, the models use either regression heads or heatmaps of keypoints. Heatmap-based approaches suffer from low face detection accuracy, while regression-based approaches have worse landmark localization. This is because regression-based methods can't afford strong landmark prediction heads. In addition, there may be misalignments between the spatially discrete features of activation maps and continuous positions of facial landmarks. The misalignment can't be properly handled by shallow convolutional layers.

SUMMARY

Mindful of shortcomings of other techniques, disclosed herein is an accurate multi-task face detection and landmark detection model called "MaskFace." The MaskFace model extends existing face detection approaches such as Retina-Face models (Guo, Zhou, Yu, Kotsia, and Zafeiriou, "Retinaface: Single-stage dense face localisation in the wild," 2019) and SSH models (Najibi, Samangouei, Chellappa, and Davis, "Ssh: Single stage headless face detector," 2017) in part by adopting ideas of Mask R-CNN models (He, Gkioxari, Dollar, and Girshick, "Mask r-cnn," 2017). At a first stage, the MaskFace model predicts bounding boxes, and at a second stage the predicted bounding boxes are used for extraction of facial features from shared representations.

MaskFace design is has two prediction heads: a face detection head and a landmark localization head (e.g., a facial landmark localization head). The face detection head outputs bounding boxes of faces. Predicted bounding boxes are then used to extract face features from fine resolution layers allowing precise localization of landmarks. To achieve good pixel-to-pixel alignment during feature extraction we adopt a RoIAlign layer following Mask R-CNN ("Mask r-cnn," 2017). Extracted face features are used to predict localization masks of landmarks.

Unlike Mask R-CNN and other multi-stage approaches, MaskFace predicts bounding boxes in a single forward pass, which advantageously increases performance. For feature extraction, MaskFace uses a Region of Interest (RoI) alignment (RoIAlign) layer ("Mask r-cnn," 2017)), which may advantageously offer good pixel-to-pixel alignment between predicted bounding boxes and discrete feature maps. Mask-Face uses a feature pyramid (Lin, Dollar, Girshick, He, Hariharan, Belongie, "Feature pyramid networks for object detection," 2017) and context modules ("Retinaface: Single-stage dense face localisation in the wild," 2019), which advantageously improve detection of tiny faces. The feature pyramid transmits deep features to shallow layers, while the context modules increase a receptive field and make prediction layers stronger. The landmark head of MaskFace is as fast as the original Mask R-CNN head, and for cases in which there are few faces in an image, prediction of landmarks adds negligible computational overhead.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
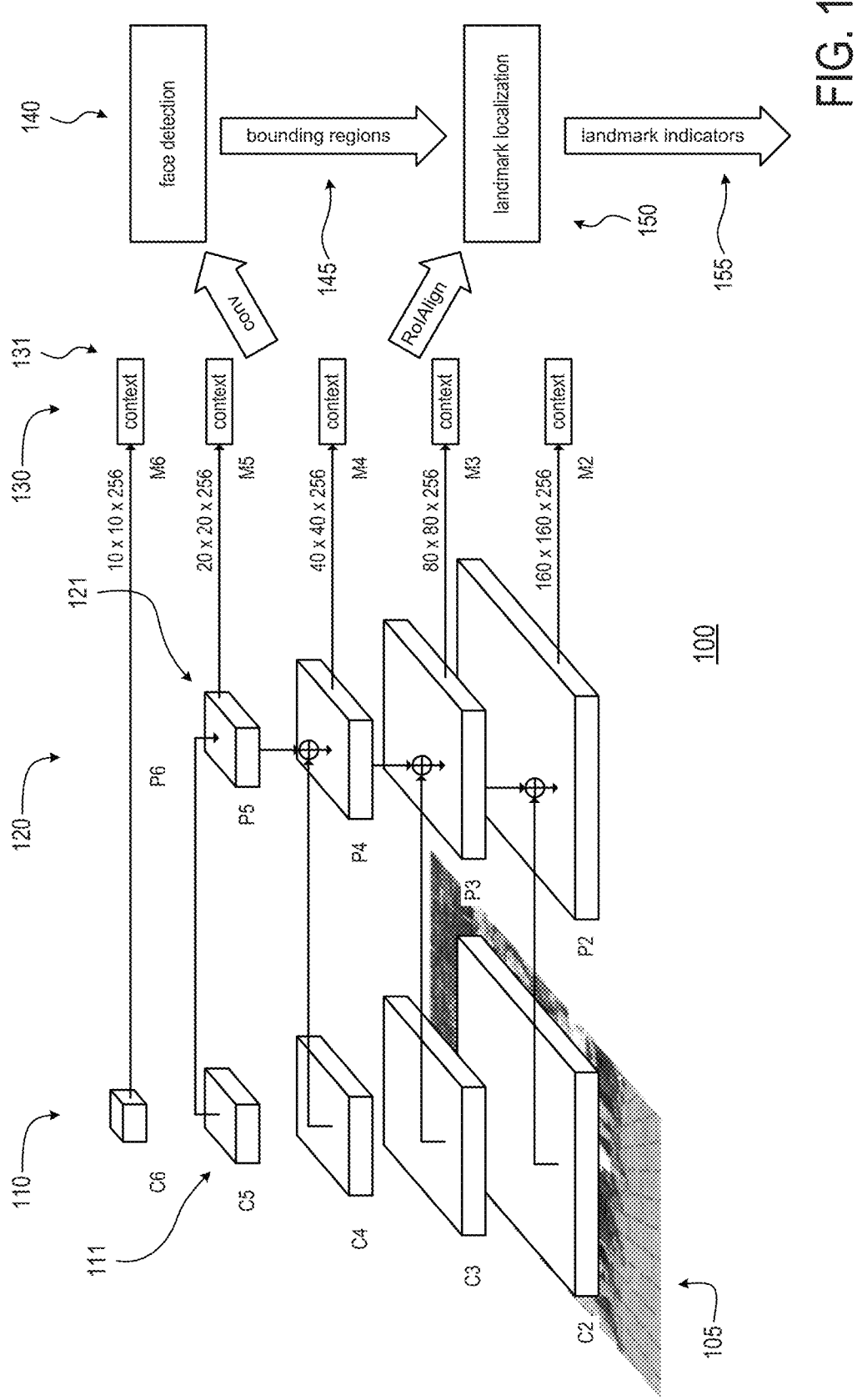
FIG. 1 shows a neural net architecture for facial-detection image processing in accordance with one or more embodiments of the present disclosure.
Figure 2:
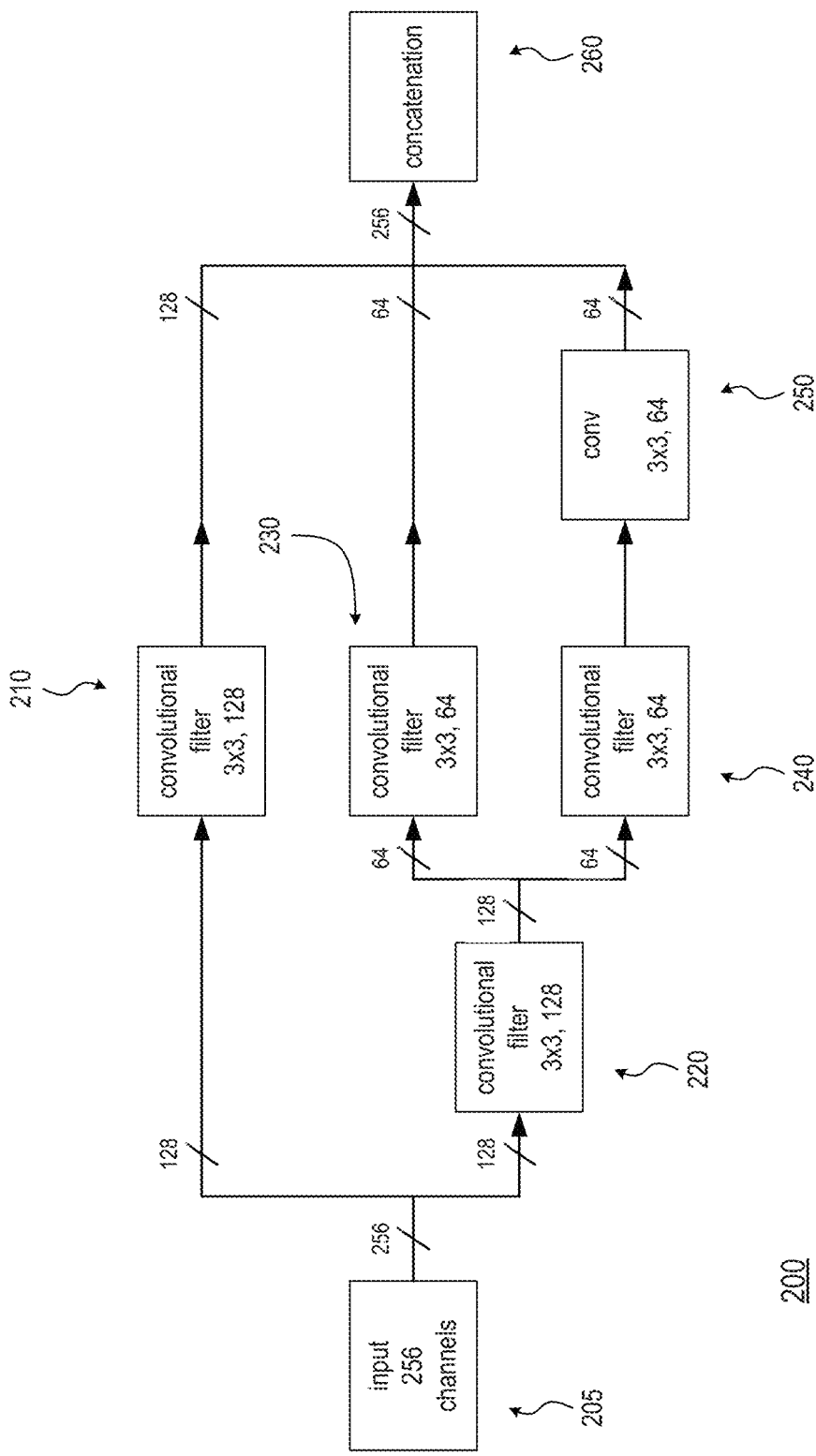
FIG. 2 shows a context module design in accordance with one or more embodiments of the present disclosure.
Figure 3:
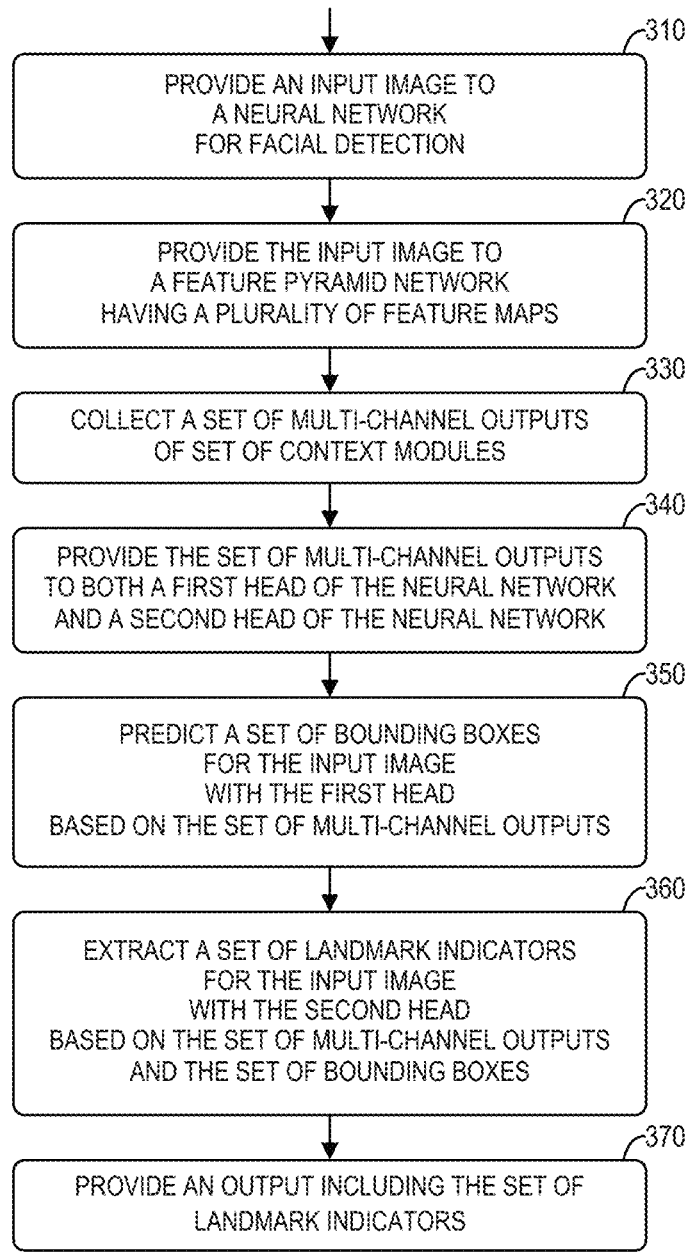
FIGS. 3-5 show flow charts of methods for processing an input image for facial detection in accordance with one or more embodiments of the present disclosure.
Figure 4:
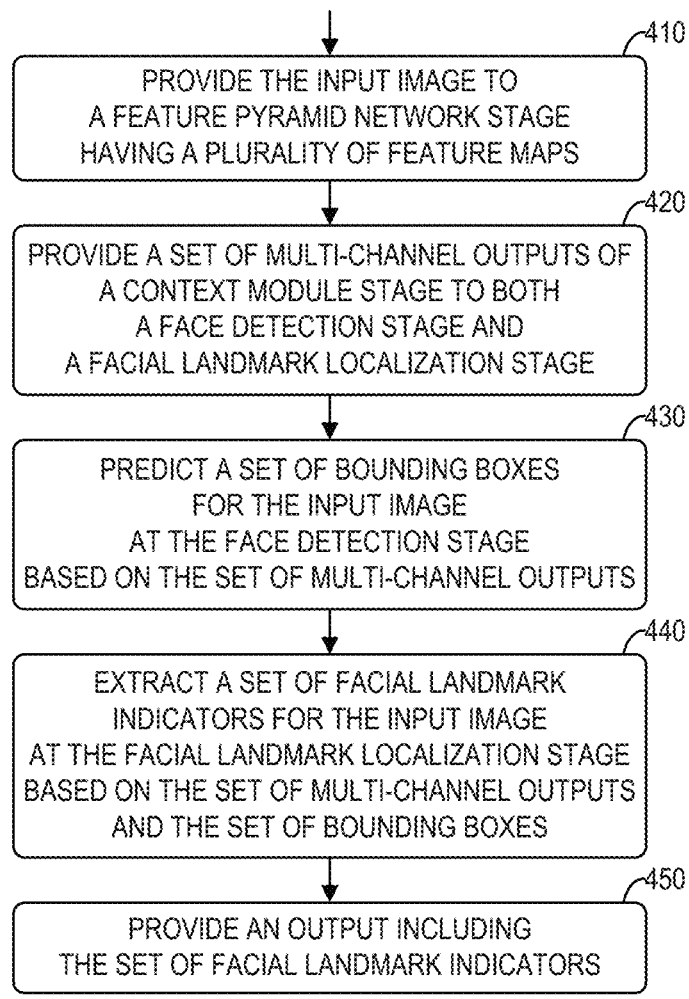
Figure 5:
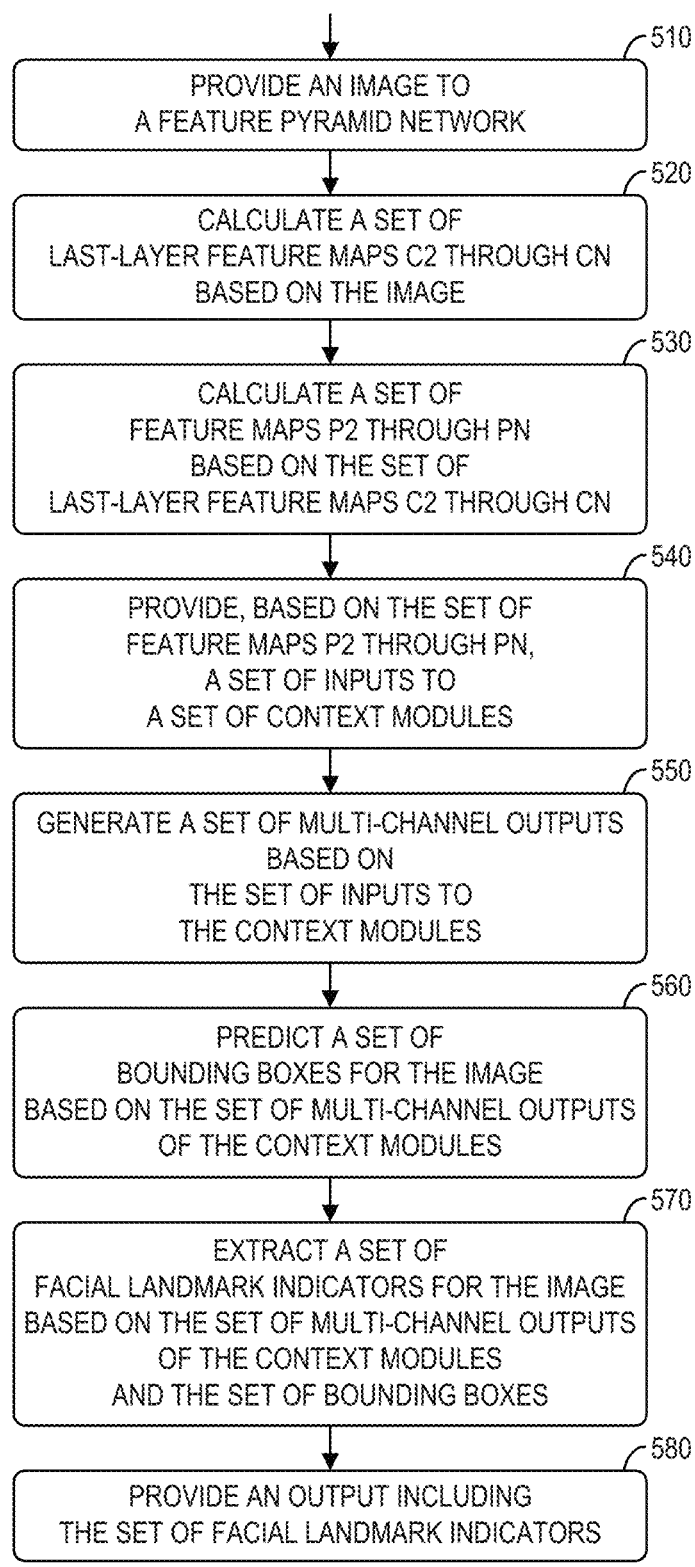

Disclosed herein are systems and methods for image processing. FIG. 1 depicts a neural net architecture for a MaskFace model which may be used by various image-processing systems, incorporating a feature pyramid network, context modules, a face detection head, and a landmark localization head. FIG. 2 depicts a context module design compatible with the neural net architecture of FIG. 1. FIGS. 3 through 5 depicts methods by which a neural net architecture, such as the architecture of FIG. 1, may process images for improved facial detection.

FIG. 1 shows a neural net architecture 100 for facial-detection image processing in accordance with one or more embodiments of the present disclosure. Neural net architecture 100 may process an image (e.g., a photograph or picture) such as an input image 105, which can potentially include one or more faces. Neural net architecture 100 comprises a Feature Pyramid Network (FPN) (in accordance with, for example, the FPNs described in "Feature pyramid networks for object detection," 2017)). The outputs of the FPN are provided to a context module stage (which may be similar to, for example, the inception modules described in Szegedy, Liu, Jia, Sermanet, Reed, Anguelov, Erhan, Vanhoucke, and Rabinovich, "Going deeper with convolutions," 2015). The outputs of the context module stage are in turn provided to a first head 140 of neural net architecture 100, and are also provided to a second head 150 of neural net architecture 100. In neural net architecture 100, first head 140 (e.g., a face detection head) advantageously provides bounding boxes to second head 150 (e.g., a landmark localization head). Neural net architecture 100 may then output a set of landmark indicators 155, which may be used in a variety of ways.

A first part 110 of the FPN may include individual feature maps of last layers 111, which may be numbered C2 through CN. For example, neural net architecture 100 is depicted as including feature maps of last layers 111 numbered from C2 through C6.

Feature maps of last layers 111 may be calculated on the basis of input image 105. For example, in embodiments such as those depicted, C2 may be calculated on the basis of input image 105; C3 may be calculated on the basis of C2; C4 may be calculated on the basis of C3; C5 may be calculated on the basis of C4; and C6 may be calculated on the basis of C5.

In some embodiments, feature maps of last layers 111 from C2 through C6 may be calculated using have strides of 4, 8, 16, 32, and 64, respectively, e.g., strides which are two raised to the power of the index number. (In other embodiments, feature maps of last layers 111 may have strides which span from two to any number, and/or may have strides which are a number other than two raised to the power of the index number, such as three raised to the power of the index number.)

A second part 120 of the FPN may include individual features maps 121, which may be numbered P2 through PN. For example, neural net architecture 100 is depicted as including feature maps 121 numbered from P2 through P6.

Feature maps 121 may be calculated on the basis of feature maps of last layers 111. For example, in embodiments such as those depicted, P5 may be calculated on the basis of C5; P4 may be calculated on the basis of C4 and P5; P3 may be calculated on the basis of C3 and P4; and P2 may be calculated on the basis of C2 and P3. In some embodiments, P6 may be calculated by applying a max-pooling layer with a stride of 2 to C5.

Feature maps 121 from P2 through P5 may be calculated using feature maps of last layers 111 with strides of 4, 8, 16, 32, and 64, respectively, e.g., strides which are two raised to the power of the index number. (In other embodiments, feature maps 121 may have strides which span from two to any number, and/or may have strides which are a number other than two raised to the power of the index number, such as three raised to the power of the index number.) Various feature maps 121 may have the same spatial size as the corresponding feature maps of last layers 111.

First part 110 and second part 120 of the FPN may accordingly interoperate to generate features maps 121 from P2 through P6, which may then be a set of outputs of the FPN. In some embodiments, feature maps 121 may have 256 channels each.

The use of an FPN may combine low-resolution, semantically strong features with high-resolution, semantically weak features via a top-down pathway and lateral connections. The result is a feature pyramid with rich semantics at all levels, which may advantageously facilitate the detection of tiny faces.

The set of multi-channel outputs of the FPN (e.g., feature maps 121, from P2 through P6) are then provided to inputs to a context module stage 130 having a respectively corresponding set of context modules 131, which may be numbered M2 through MN. (An implementation of a context module is depicted in FIG. 2 and is discussed further herein.) The set of context modules 131 may then provide a respectively corresponding set of multi-channel outputs, which may be collected and provided to both first head 140 and second head 150. For example, in embodiments such as those depicted, an output of context module M2 may be calculated based on feature map P2; an output of context module M3 may be calculated based on feature map P3; an output of context module M4 may be calculated based on feature map P4; an output of context module M5 may be calculated based on feature map P5; and an output of context module M6 may be calculated based on feature map P6.

First head 140, which may be a face detection head, may predict a set of bounding regions 145 based on the set of multi-channel outputs of the set of context modules 131. Bounding regions 145 may correspond with input image 105, and may, for example, indicate portions, areas, and/or regions of input image 105 that may correspond to detected faces. In some embodiments, bounding regions 145 may be bounding boxes, with rectangular shapes. For some embodiments, bounding regions 145 may have other shapes (such as circular shapes, hexagonal shapes, or any other regular or irregular shape). First head 140 may use 1×1 filters. The prediction of the set of bounding boxes may be done in a single forward pass.

In some embodiments, 1×1 convolutional layers with shared weights may be applied to the set of multi-channel outputs of the set of context modules 131, for use in anchor box regression and classification. Neural net architecture 100 may use translation-invariant anchor boxes (which may be similar to, for example, those described in Ren, He, Girshick, and Sun, "Faster r-cnn: Towards real-time object detection with region proposal networks," 2015). The base anchors may have areas of $\{16^2, 32^2, 64^2, 128^2, 256^2\}$ at levels corresponding with context modules M2 to M6, respectively. For each of the M2 to M6 levels, neural net architecture 100 may use anchors with sizes of $\{2^0, 2^{1/3}, 2^{2/3}\}$ of the base anchors, which may advantageously provide dense scale coverage. Some or all of the anchors may have an aspect ratio of 1.0. In some embodiments, there may be three anchors for each of the M2 to M6 levels, across levels they may cover a scale range of approximately 16 to 406 pixels. For an input image of 640×640 pixels, there may be a total of approximately 112,000 anchors.

If an anchor box has an intersection-over-union (IoU) overlap with a ground truth box greater of than 0.5, then the anchor may be considered a positive example (and/or may be assigned a positive label). If the overlap is less than 0.3, then the anchor may be considered a negative example and/or may be assigned a negative label. Some or all anchors with overlaps of between 0.3 and 0.5 may be ignored during training. Additionally, a low-quality matching strategy may be used for anchor assigning. For each ground truth box, a set of anchor boxes may be found that have a maximum overlap with it. For each anchor in the set, if the anchor is unmatched, it may be matched to a ground truth with the highest IoU. Experiments suggest that using a low-quality matching strategy may advantageously improve accuracy.

Bounding regions 145 predicted by first head 140 may then be provided to second head 150, which may be a landmark localization head (e.g., a facial landmark localization head). Second head 150 may treat the predictions (e.g., bounding regions 145) from first head 140 as Regions of Interest (ROIs) for extracting features for landmark localization (e.g., for facial landmark localization). Second head 150 may use an RoI alignment (RoIAlign) layer for feature extraction (which may be similar to layers described in "Mask r-cnn," 2017)), and may accordingly extract a set of landmark indicators for input image 105, based on the multi-channel outputs of context modules 131 and the bounding regions 145.

Proposals for predictions may be filtered. For example, predictions with confidences less than approximately 0.02 may be ignored. In some embodiments, a non-maximum suppression with a threshold of approximately 0.7 may be applied to remaining predictions. Subsequently, proposals may be matched with ground truth boxes. If an IoU overlap of proposals with ground truth boxes is higher than approximately 0.5, then proposals may be used for extracting landmark features from the appropriate layers of the FPN corresponding with M2 to M6.

A post-FPN RoI may be assigned having a width $w_{roi}$ and height $h_{roi}$ to a layer of the FPN corresponding with MN by equation 1 below:

$$k = \max\left(2, \lfloor k_0 + \log_2(\sqrt{w_{roi}h_{roi}}/224)\rfloor\right) \quad (1)$$

where $k_0=4$. Under this equation, if an area of a predicted bounding box is smaller than $112^2$, it may be assigned to the FPN layers corresponding with M2; between $112^2$ to $224^2$, it may be assigned to the FPN layers corresponding with M3; and so on. Relatively fine resolution layers of FPH corresponding with M2 may be used with a stride of 4 for feature extraction. Experiments suggest that high-resolution feature maps may advantageously promote precision of landmarks localization of relatively small faces within an input image.

As discussed herein, neural net architecture 100 may use an RoIAlign layer to extract features from assigned feature maps. The RoIAlign layer may facilitate proper alignment of extracted features with input RoIs. The RoIAlign layer may output 14×14 resolution features that may then be fed into a number of consequent convolutional layers (e.g., convolutional 3×3, with 256 filters, and a stride of 1), a single transposed convolutional layer (e.g., a convolutional transpose 4×4, with K filters, and a stride of 2), and a bilinear interpolation layer that upsamples masks to a 56×56 resolution. An output mask tensor may have a size of K×56×56. K may be a number of facial landmarks.

The neural net architecture 100 disclosed herein may have a slightly increased number of calculations associated with the landmark localization head in comparison with a number of calculations for overall feature extraction, and may therefore advantageously be employed at very low relative cost while providing improved precision for landmark localization.

A landmark's location may be modeled as a one-hot mask, and the neural net architecture disclosed herein may be adopted to predict K masks, one for each of K landmarks (e.g., facial landmarks such as a left eye, a right eye, and so on).

For neural net architecture 100, multi-task loss for an image may be defined as in equation 2 below:

$$L = L_{cls} + L_{box} + \lambda_{kp}L_{kp} \quad (2)$$

Where:
$L_{cls}$ may be an anchor binary classification loss (face vs background);
$L_{box}$ may be a regression loss of anchors' positions; and
$L_{kp}$ may be a localization loss of keypoints weighted with a parameter $\lambda_{kp}$;

For neural net architecture 100, an anchor classification may use a focal loss in accordance with equation 3 below:

$$L_{cls} = -\frac{1}{N_{pos}}\left[\alpha \sum_{i \in Pos}(1-p_i)^\gamma \log p_i + (1-\alpha)\sum_{i \in Neg} p_i^\gamma \log(1-p_i)\right] \quad (3)$$

Where, additionally:
$N_{pos}$ may be a number of positive anchors that should be classified as faces ($p_i$ should be equal to 1);
$N_{neg}$ may be a number of negative anchors that should be classified as background ($p_i$ should be equal to 0);
Pos may be a set of indices of positive anchors;
Neg may be a set of indices of negative anchors;
$p_i$ may be a predicted probability of anchor i being a face;
$\alpha$ may be a balancing parameter between a classification loss of positive anchors and negative anchors; and
$\gamma$ may be a focusing parameter that reduces a loss for well-classified samples;

For neural net architecture 100, a bounding box regression may adopt a smooth $L_1$ loss (smooth$_{L1}$) in accordance with equation 4 below:

$$L_{box} = \frac{1}{N_{pos}}\sum_{i \in Pos}\text{smooth}_{L1}(t_i - t_i^*) \quad (4)$$

Where, additionally:
$t_i$ may be a vector representing 4 parameterized coordinates of the predicted bounding box (e.g., a vector associated with a positive anchor i);
$t_i^*$ may be a vector representing the 4 parameterized coordinates of a ground-truth box associated with a positive anchor i;

For neural net architecture 100, prediction of landmarks' locations may apply cross-entropy loss to each of the landmarks' masks, in accordance with equations 5 and 6 below:

$$L_{kp} = -\frac{1}{KN_{pos}}\sum_{i \in Pos}\sum_{k=1}^{K}\log M_{i,k,j_{i,k}^*,l_{i,k}^*} \quad (5)$$

-continued $$M_{i,k,j,l} = \frac{\exp(L_{i,k,j,l})}{\sum_{j=1}^{m}\sum_{l=1}^{m}\exp(L_{i,k,j,l})} \quad (6)$$

Where, additionally:

$L_{i,k,j,l}$ may be a predicted logit for a landmark k for a positive sample i;

$M_{i,k,j,l}$ may be a mask for a landmark k for a positive sample i;

$j_{i,k}*$ may be an index of a mask pixel at which a ground truth landmark k in positive sample i is located; and $l_{i,k}*$ may be an index of a mask pixel at which a ground truth landmark k in positive sample i is located.

For each of the K keypoints of a face, a training target may be a one-hot m×m binary mask where only a single pixel is labeled as foreground. In some embodiments, parameters a and y may be set to 0.25 and 2, respectively. Following experimental results, neural net architecture 100 may select an optimal value of the keypoint loss weight $\lambda_{kp}$ equal to approximately 0.25, which may advantageously provide a good trade-off between an accuracy of face detection and an accuracy of landmark localization.

Second head 150 may then output landmark indicators 155. In some embodiments, landmark indicators 155 may comprise one or more coordinates corresponding with bounding boxes of faces on input image 105. For some embodiments, landmark indicators 155 may comprise one or more coordinates corresponding with landmarks of faces on input image 105 (e.g., facial landmarks, such as locations related to facial structures and/or facial features). In various embodiments, landmark indicators 155 may be used to alter a copy of input image 105 (such as by marking up that copy). In various embodiments, landmark indicators 155 may be presented as a separate data file corresponding with input image 105, or as metadata embedded in an annotated copy of input image 105.

In some embodiments, a customer may use a cloud-based computing service to provide an input image to a neural net architecture such as neural net architecture 100, and may then receive landmark indicators 155 in some manner (e.g., as direct annotations on a copy of the input image, as a separate data file, and/or as metadata). For some embodiments, faces may be cropped in a copy of an input image, or blurred out within a copy of an input image. In some embodiments, following the improved facial-detection techniques discussed herein, facial recognition techniques may be performed. In various embodiments, the extraction of landmark indicators 155 may enable various subsequent applications that may make use of the locations of detected faces within an image.

Turning to FIG. 2, a context module 200 comprises an input 205, an output 260, and various branches from input 205 to output 260, with various sequences of convolutional filters (or layers) performing processing along the various branches. The design of context module 200 may be substantially similar to the design of context modules 131 of FIG. 1. When applied with independent weights to their input feature maps, such context modules may advantageously increase a receptive field and/or add context to predictions. Experimental results suggest that such context modules also advantageously improve accuracy.

As depicted, both input 205 and output 260 may have 256 channels. On the first branch from input 205 to output 260, a first portion of the channels of input 205 (e.g., 128 channels) may be processed merely through a first convolutional filter 210. On the second branch and the third branch, a second portion of the channels of input 205 (e.g., 128 channels) may be processed through a second convolutional filter 220. On the second branch, a first subset of those channels (e.g., 64 channels) may then be processed through a third convolutional filter 230; while on the third branch, a second subset of those channels (e.g., 64 channels) may then be processed through a fourth convolutional filter 240 and a fifth convolutional filter 250. In various embodiments, a Rectified Linear Units (ReLU) processing may be applied after each convolutional filter (or layer).

Subsequently, output 260 may concatenate the output of first convolutional filter 210 (e.g., 128 channels), the output of third convolutional filter 230 (e.g., 64 channels), and the output of fifth convolutional filter 250 (e.g., 64 channels). Output 260 may thus comprise a total of 256 channels from the various branches through the various convolutional filters.

The convolutional filters of context module 200 are depicted as including 3×3 convolutional filters. In comparison with larger convolutional filters, 3×3 convolutional filters may advantageously reduce a number of calculations in context module 200. In some embodiments, some or all of the convolutional filters of context module 200 may include convolutional filters of other sizes.

In addition, although input 205 and output 260 are depicted as having 256 channels each, in various embodiments, input 205 and output 260 may have other numbers of channels. Similarly, although depicted as having a particular number of branches and a particular number of convolutional filters in a particular configuration, alternate embodiments may have different branches from input to output, and/or different sequences of convolutional-filter processing, in different configurations.

FIGS. 3-5 show flow charts of methods for processing an input image for facial detection. In FIG. 3, a method 300 may comprise a first part 310, a second part 330, a third part 330, a fourth part 340, a fifth part 350, a sixth part 360, and/or a seventh part 370.

In first part 310, an input image may be provided to a neural network for facial detection. The input image may be substantially similar to input image 105, and the neural network may have an architecture substantially similar to that of neural net architecture 100.

In second part 320, the input image may be provided to an FPN having a set of feature maps. For example, the FPN may be substantially similar to the FPN of neural net architecture 100, and may have a first part including feature maps of last layers (which may be substantially similar to feature maps of last layers 111) and a second part including feature maps calculated based on the feature maps of last layers (which may be substantially similar to feature maps 121). In various embodiments, the FPN may have a set of outputs respectively corresponding with inputs to the set of context modules (see below). For some embodiments, the set of feature maps may be calculated based on a set of feature maps of last layers having strides of powers of two.

In third part 330, a set of multi-channel outputs of a respectively corresponding set of context modules of the neural network may be collected. The set of multi-channel outputs may correspond with the input image. The set of multi-channel outputs may be substantially similar to outputs of context modules 131 of neural net architecture 100. In some embodiments, the context modules may use 3×3 filters.

In fourth part 340, set of multi-channel outputs may be provided to both a first head of the neural network and a second head of the neural network. The first head may be substantially similar to first head 140, and the second head may be substantially similar to second head 150. The first head may be a face detection head; and the second head may be a landmark localization head.

In fifth part 350, a set of bounding boxes for the input image may be predicted with the first head based on the set of multi-channel outputs. In some embodiments, the first head may use 1×1 filters (e.g., convolutional filters). For example, as discussed herein, the prediction may use 1×1 convolutional shared weights applied to the multi-channel outputs of the set of context modules, and may use anchor box regression and classification as discussed herein. In some embodiments, the prediction of the set of bounding boxes may be done in a single forward pass.

In sixth part 360, a set of landmark indicators for the input image may be extracted with the second head based on the set of multi-channel outputs and the set of bounding boxes. In various embodiments, the second head may include an RoIAlign layer. The second head may treat the bounding boxes from the first head as RoIs for extracting features for landmark localization, and may use the RoIAlign layer for feature extraction, as discussed herein.

In seventh part 370, an output including the set of landmark indicators may be provided. The output may be presented an altered copy of the input image, another data file separate from the input image, or as metadata embedded in the input image, as discussed herein.

Turning to FIG. 4, a method 400 of processing images with a neural network may comprise a first part 410, as second part 420, a third part 430, a fourth part 440, and/or a fifth part 450. In first part 410, the input image may be provided to an FPN stage of the neural network. For example, neural network may have an architecture substantially similar to neural net architecture 105, and the FPN may be substantially similar to the FPN of neural net architecture 100. The FPN may have a first part including feature maps of last layers (which may be substantially similar to feature maps of last layers 111) and a second part including feature maps calculated based on the feature maps of last layers (which may be substantially similar to feature maps 121). In various embodiments, the FPN may have a set of outputs respectively corresponding with inputs to the set of context modules (see below). For some embodiments, the set of feature maps is calculated based on a set of feature maps of last layers having strides of powers of two. The FPN stage may a set of outputs respectively corresponding with a set of inputs to a context module stage (see below).

In second part 420, a set of multi-channel outputs of a context module stage of the neural network may be provided to both a face detection stage of the neural network and a facial landmark localization stage of the neural network. The set of multi-channel outputs may be substantially similar to outputs of context modules 131 of neural net architecture 100. The face detection stage may be substantially similar to first head 140, and the facial landmark localization stage may be substantially similar to second head 150. The set of multi-channel outputs may correspond with an input image of the neural network. In some embodiments, the context modules may use 3×3 filters.

In third part 430, a set of bounding boxes for the input image may be predicted at the face detection stage based on the set of multi-channel outputs of the context module stage. In some embodiments, the face detection stage may use 1×1 filters (e.g., convolutional filters). For example, as discussed herein, the prediction may use 1×1 convolutional shared weights applied to the multi-channel outputs of the set of context modules, and may use anchor box regression and classification as discussed herein. In some embodiments, the prediction of the set of bounding boxes may be done in a single forward pass.

In fourth part 440, a set of facial landmark indicators for the input image may be extracted at the facial landmark localization stage based on the set of multi-channel outputs of the context module stage and the set of bounding boxes predicted at the face detection stage. In various embodiments, the facial landmark localization stage may include an RoIAlign layer. The facial landmark localization stage may treat the bounding boxes from the first head as RoIs for extracting features for landmark localization, and may use the RoIAlign layer for feature extraction, as discussed herein.

In fifth part 450, an output including the set of facial landmark indicators may be provided. The output may be presented an altered copy of the input image, another data file separate from the input image, or as metadata embedded in the input image, as discussed herein.

Turning to FIG. 5, a method 500 of a neural-network based system for image processing may comprise a first part 510, a second part 520, a third part 530, a fourth part 540, a fifth part 550, a sixth part 560, a seventh part 570, and an eighth part 580.

In first part 510, an image may be provided to an FPN of a neural network. The image may be substantially similar to input image 105, and the neural network may have an architecture substantially similar to that of neural net architecture 100.

In second part 520, a set of feature maps of last layers C2 through CN may be calculated with the FPN, based on the image. The FPN may be substantially similar to the FPN of neural net architecture 100, and may have a first part including feature maps of last layers (which may be substantially similar to feature maps of last layers 111). In various embodiments, the FPN may have a set of outputs respectively corresponding with inputs to the set of context modules (see below). For some embodiments, the set of feature maps is calculated based on a set of feature maps of last layers having strides of powers of two.

In third part 530, a set of feature maps P2 through PN may be calculated with the FPN, based on the set of feature maps of last layers C2 through CN. The FPN may have a second part including feature maps calculated based on the feature maps of last layers (which may be substantially similar to feature maps 121).

In fourth part 540, a set of inputs may be provided to a respectively corresponding set of context modules, the set of inputs being based on the set of feature maps P2 through PN as discussed herein.

In fifth part 550, a set of multi-channel outputs of the context modules may be generated based on the set of inputs to the context modules. The set of multi-channel outputs may be substantially similar to outputs of context modules 131 of neural net architecture 100. In some embodiments, the context modules may use 3×3 filters.

In sixth part 560, a set of bounding boxes for the image may be predicted at a first head of the neural network, based on the set of multi-channel outputs of the context modules. The first head may be a face detection head. In some embodiments, the first head may use 1×1 filters (e.g., convolutional filters). For example, as discussed herein, the prediction may use 1×1 convolutional shared weights applied to the multi-channel outputs of the set of context modules, and may use anchor box regression and classification as discussed herein. In some embodiments, the prediction of the set of bounding boxes may be done in a single forward pass.

In seventh part 570, a set of facial landmark indicators for the image may be extracted at a second head of the neural network, based on the set of multi-channel outputs of the context modules and the set of bounding boxes predicted at the first head. The second head may be a landmark localization head. In various embodiments, the second head may include an RoIAlign layer. The second head may treat the bounding boxes from the first head as RoIs for extracting features for landmark localization, and may use the RoIAlign layer for feature extraction, as discussed herein.

In eighth part 580, an output including the set of facial landmark indicators may be provided. The output may be presented an altered copy of the input image, another data file separate from the input image, or as metadata embedded in the input image, as discussed Instructions for carrying out method 300, method 400, and/or method 500 may be executed by a control unit having one or more processors, based on instructions stored in a memory of the controller (e.g., a non-transitory memory, such as a magnetic storage media, an optical storage media, or a non-volatile storage media). The control unit and the memory may be portions of a computing system, which may be local to a user or remote to a user. For some embodiments, the computing system may be at a location remote to the user (e.g., as in a cloud-based server), and the user may interact with the computing system (and thereby initiate one or more of method 300, method 400, and/or method 500) through a suitable communication interface (e.g., a wired or wireless communication interface to the internet).

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as computing systems and/or cloud-based computing systems discussed with respect to FIGS. 1-5. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects.

As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments. Also, terminology in which elements are presented in a list using "and/or" language means any combination of the listed elements. For example, "A, B, and/or C" may mean any of the following: A alone; B alone; C alone; A and B; A and C; B and C; or A, B, and C.

The following claims particularly point out subject matter from the above disclosure that is regarded as novel and non-obvious.

The invention claimed is:

1. A method comprising:
providing an input image to a neural network for facial detection;
collecting a set of multi-channel outputs of a respectively corresponding set of context modules of the neural network, the set of multi-channel outputs corresponding with the input image;
providing the set of multi-channel outputs to both a first head of the neural network and a second head of the neural network, wherein the first head is a face detection head, wherein the second head is a landmark localization head, and wherein the first head and the second head share representations;
predicting a set of bounding regions for the input image with the first head based on the set of multi-channel outputs;
extracting a set of landmark indicators for the input image with the second head based on the set of multi-channel outputs and the set of bounding regions; and
providing an output including the set of landmark indicators,
wherein the context modules use 3×3 filters, and the first head uses 1×1 filters.

2. The method of claim 1, wherein the second head includes an RoIAlign layer.

3. The method of claim 1, wherein the prediction of the set of bounding regions is done in a single forward pass.

4. The method of claim 1, further comprising:
providing the input image to a feature pyramid network having a set of feature maps.

5. The method of claim 4, wherein the feature pyramid network has a set of outputs respectively corresponding with inputs to the set of context modules.

6. The method of claim 4, wherein the set of feature maps is calculated based on a set of feature maps of last layers having strides of powers of two.

7. A method of processing images with a neural network, the method comprising:
providing a set of multi-channel outputs of a context module stage of the neural network to both a face detection stage of the neural network and a facial landmark localization stage of the neural network, the set of multi-channel outputs corresponding with an input image of the neural network, wherein the face detection stage is a face detection head, wherein the landmark localization stage is a landmark localization head, and wherein the face detection head and the landmark localization head share representations;
predicting a set of bounding boxes for the input image at the face detection stage based on the set of multi-channel outputs of the context module stage;

extracting a set of facial landmark indicators for the input image at the facial landmark localization stage based on the set of multi-channel outputs of the context module stage and the set of bounding boxes predicted at the face detection stage; and providing an output including the set of facial landmark indicators, wherein the context module stage includes 3×3 filters, and wherein the face detection head uses 1×1 filters.

8. The method of processing images with a neural network of claim 7, wherein the set of facial landmark indicators is extracted using an RoIAlign layer.

9. The method of processing images with a neural network of claim 7, wherein the prediction of the set of bounding boxes is done in a single forward pass.

10. The method of processing images with a neural network of claim 7, further comprising:

providing the input image to a feature pyramid network stage of the neural network, the feature pyramid network stage having a set of feature maps.

11. The method of processing images with a neural network of claim 10, wherein the feature pyramid network stage has a set of outputs respectively corresponding with a set of inputs to the context module stage.

12. The method of processing images with a neural network of claim 10, wherein the set of feature maps is calculated based on a set of feature maps of last layers having strides of powers of two.

13. A neural-network system for image processing, comprising:

a control unit having one or more processors; and a non-transitory memory having executable instructions stored therein which, when executed by the control unit, cause the control unit to:

provide an image to a feature pyramid network of the neural-network;

calculate, with the feature pyramid network, a set of feature maps of last layers C2 through CN based on the image;

calculate, with the feature pyramid network, a set of feature maps P2 through PN based on the set of feature maps of last layers C2 through CN;

provide, based on the set of feature maps P2 through PN, a set of inputs to a respectively corresponding set of context modules;

generate, with the set of context modules, a set of multi-channel outputs based on the set of inputs to the context modules;

predict, at a first head of the neural network, a set of bounding regions for the image based on the set of multi-channel outputs of the context modules;

extract, at a second head of the neural network, a set of facial landmark indicators for the image based on the set of multi-channel outputs of the context modules and the set of bounding regions predicted at the first head, wherein the first head is a face detection head, wherein the second head is a landmark localization head, and wherein the first head and the second head share representations; and provide an output including the set of facial landmark indicators, wherein the feature maps of last layers C2 through CN have strides of powers of two, wherein the context modules use 3×3 filters, and wherein the first head uses 1×1 filters.

14. The neural-network system for image processing of claim 13, wherein the set of facial landmark indicators is extracted using an RoIAlign layer.

15. The neural-network system for image processing of claim 13, wherein the prediction of the set of bounding regions is done in a single forward pass.

* * * * *